(12) United States Patent  
Bendersky et al.

(10) Patent No.: US 10,554,637 B1
(45) Date of Patent: Feb. 4, 2020

(54) SECURE AND RECONSTRUCTIBLE DISTRIBUTION OF DATA AMONG NETWORK RESOURCES

(71) Applicant: CyberArk Software Ltd., Petach-Tikva (IL)

(72) Inventors: Arthur Bendersky, Tel Aviv (IL); Tal Kandel, Pardes Hana-Karkur (IL); Hadas Elkabir, Hod Hasharon (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 16/400,404

(22) Filed: May 1, 2019

(51) Int. Cl.
*H04L 29/06* (2006.01)
*H04L 9/32* (2006.01)
*H04L 9/14* (2006.01)

(52) U.S. Cl.
CPC ............ *H04L 63/0471* (2013.01); *H04L 9/14* (2013.01); *H04L 9/3239* (2013.01); *H04L 63/0435* (2013.01); *H04L 63/0442* (2013.01)

(58) Field of Classification Search
CPC ..... H04L 63/0471; H04L 9/14; H04L 9/3239; H04L 63/0435; H04L 63/0442
See application file for complete search history.

(56) References Cited

U.S. PATENT DOCUMENTS

| 2011/0138192 A1* | 6/2011 | Kocher | G06F 21/602 |
| | | | 713/189 |
| 2014/0195689 A1* | 7/2014 | Gill | H04L 67/2833 |
| | | | 709/226 |
| 2015/0381487 A1* | 12/2015 | Broz | H04L 45/74 |
| | | | 713/153 |
| 2016/0119346 A1* | 4/2016 | Chen | H04L 63/0876 |
| | | | 713/170 |

* cited by examiner

*Primary Examiner* — Mohammed Waliullah
(74) *Attorney, Agent, or Firm* — Finnegan, Henderson, Farabow, Garrett & Dunner, LLP

(57) ABSTRACT

Disclosed embodiments relate to systems and methods for distributed transmission of divisible and reconstructible data among network resources. Techniques include identifying data to be securely transmitted across a network to a receiving network resource; applying a splitting scheme to form one or more data portions; obtaining a unique session identifier; selecting a distribution scheme; accessing one or more cryptographic keys; encrypting one or more data portions to form a plurality of corresponding encrypted blocks; transmitting, according to the selected distribution scheme, the one or more of the plurality of encrypted blocks to one or more of the constituent network nodes, en route to the receiving network resource. The receiving network resource may be configured to, upon obtaining the one or more data portions, and with reference to the unique session identifier, combine and validate the one or more data portions.

19 Claims, 7 Drawing Sheets

SECURE AND RECONSTRUCTIBLE DISTRIBUTION OF DATA AMONG NETWORK RESOURCES

BACKGROUND

In computer networks, whenever one machine or application transmits data to another machine or application, the data is vulnerable to eavesdropping, interception, copying, modification, rerouting, duplication, deletion, or other potentially insecure actions. For example, when a server transmits application code, a secret or credential, or sensitive data to another server, a "man-in-the-middle" or another type of eavesdropper may potentially obtain access to the transmission before it reaches the receiving server. Such attacks or insecurities may arise at several points along the transmission path, including at the transmitting server itself, at one or more intermediary points along the path (e.g., servers that reroute the communication, proxy servers, etc.), or at the receiving server.

When one or more of these resources is compromised (e.g., with malware, an insecure application that may be exploited, privileged access rights, etc.), the data being transmitted becomes insecure. For example, an attacker may identify attributes about the data itself or its metadata, such as the identities of the sender and recipient, network addresses of the sender and recipient, the file size or data size, embedded credentials, timing or patterns in the transmission, and other attributes. Even if this transmitted data or metadata is encrypted, the attacker can still use these attributes to plan future attacks.

Existing techniques are inadequate to protect against these threats to the transmission of data, application code, secrets, and other communications. For example, encrypting the communication may raise the difficulty for an attacker to obtain the contents of the communication. But as noted above, even if the communication is encrypted, attackers can still use attributes of the encrypted communication as well as its metadata to obtain information they can use in orchestrating an attack. Moreover, if the attacker is able to gain access to the encryption key or otherwise penetrate the encryption scheme, the attacker will also be able to access the communication itself.

In view of the serious security vulnerabilities associated with transmitting data or other content across a network, and the technical deficiencies of existing security approaches, technological solutions are needed for securing the transmission of network communications. Solutions should not require preestablished trust between parties in the communication, since preestablished trust (e.g., between two servers) is cumbersome to implement and also gives rise to security gaps when an attacker compromises one of the trusted parties. Solutions, therefore, should be able to operate in a zero-trust environment, where parties involved in transmitting a communication do not necessarily have any trust relationship or even any prior knowledge of each other. Moreover, solutions should be able to securely transmit communications both within a particular organization or enterprise (e.g., within one company's network environment), as well as across different organizations or enterprises. For example, the techniques discussed below may be employed to securely transmit an organization's data among network resources of the organization itself, or may be employed to transmit the organization's data among network resources of one or more other organizations.

According to techniques discussed further below, security may be enhanced by transmitting communications in a manner where no network resource along the transmission path knows what resource is the final, receiving resource. In some embodiments, the identity of the recipient may be known only to the transmitting resource or transmission manger. Further, techniques discussed below allow for transmitted data to be broken or split into two or more pieces according to predefined algorithms, or randomly, such that the intermediary network resources along the transmission path also do not know how many pieces the data has been split into. In addition, the sequence of transmission along the path may be unknown to the intermediary network resources, and the data pieces may be encrypted such that intermediary resources can decrypt only one layer of the encryption before passing the data piece they received to another intermediary resource or to the recipient.

For added security, in some embodiments while the transmitting resource or manager may determine or learn the number of intermediary resources through which to transmit data, the particular path or sequence, or the identity of the receiving resource, the transmitting resource or manger may be configured to forget (e.g., delete) that information upon transmission of the data. In that manner, not even the transmitting resource or manager can be compromised as a vulnerability after a transmission.

Additional security may be added in embodiments where the receiving network resource itself cannot determine in advance from which other network resources it will receive portions of the transmitted data, or in what order. Indeed, the receiving network resource may not be configured to determine, or be capable of determining, how many pieces of the partitioned data it needs to receive in order to reconstruct the original transmitted data until the receiving network resource compares a hash of the received data with a computed hash and confirms that the two hashes match.

SUMMARY

The disclosed embodiments describe non-transitory computer readable media, systems, and methods for distributed transmission of divisible and reconstructible data among network resources. For example, in an exemplary embodiment, there may be a non-transitory computer readable medium including instructions that, when executed by at least one processor, cause the at least one processor to perform operations for distributed transmission of divisible and reconstructible data among network resources. The operations may comprise identifying, at a transmitting network resource, data to be securely transmitted across a network to a receiving network resource; applying a splitting scheme to the data to form one or more data portions; obtaining a unique session identifier; selecting a distribution scheme for the one or more data portions, the distribution scheme comprising one or more constituent network nodes, the one or more constituent network nodes each lacking access to the selected distribution scheme and each having: an associated network address, and a cryptographic key; accessing one or more cryptographic keys maintained by the transmitting network resource; encrypting, using the one or more cryptographic keys maintained by the transmitting network resource, the one or more data portions to form a plurality of corresponding encrypted blocks, wherein the one or more constituent network nodes are configured to: decrypt at least a portion of one or more of the plurality of encrypted blocks, and route the decrypted portion of the one or more of the plurality of encrypted blocks to either another of the one or more constituent network nodes or to the receiving network resource; and transmitting, according to the selected distribution scheme, the one or more of the plurality of encrypted blocks to one or more of the constituent network nodes, en route to the receiving network resource; wherein the receiving network resource is configured to, upon obtaining the one or more data portions, and with reference to the unique session identifier, combine and validate the one or more data portions.

According to a disclosed embodiment, the transmitting network resource and the receiving network resource operate on a zero-trust basis with respect to each other.

According to a disclosed embodiment, the transmitting network resource and the receiving network resource are in separate networks.

According to a disclosed embodiment, the selecting of the distribution scheme includes randomly selecting the one or more constituent network nodes.

According to a disclosed embodiment, the randomly selecting includes randomly selecting a number of constituent network nodes for each of one or more data portions to traverse en route to the receiving network resource.

According to a disclosed embodiment, the operations further comprise: computing, before the applying of the splitting scheme, a hash value based on the data; and including the hash value in at least one of the plurality of encrypted blocks.

According to a disclosed embodiment, the receiving network resource is further configured to validate the one or more data portions by computing a hash value for the combined one or more data portions and comparing the computed hash value with the hash value included in the at least one of the plurality of encrypted blocks.

According to a disclosed embodiment, the receiving network resource cannot determine, before the combining and validating of the one or more data portions, whether it has received all of the one or more data portions.

According to a disclosed embodiment, the distribution scheme for the one or more data portions comprises different distribution paths for different of the one or more data portions.

According to a disclosed embodiment, the operations further comprise deleting, after the transmitting of the plurality of encrypted blocks, the distribution scheme.

According to a disclosed embodiment, the receiving network resource is further configured to, upon receiving the one or more data portions, and with reference to the unique session identifier: combine the one or more data portions according to a first combination; attempt to validate the one or more data portions according to the first combination, wherein the attempted validation according to the first combination fails; combine the one or more data portions according to a second combination; attempt to validate the one or more data portions according to the second combination, wherein the attempted validation according to the second combination succeeds.

According to a disclosed embodiment, the splitting scheme is applied to form at least one portion of the data and at least one fictive portion that does not contain any of the data, and wherein both the at least one portion and the at least one fictive portion are transmitted according to the selected distribution scheme.

According to another disclosed embodiment, a method may be implemented for distributed transmission of divisible and reconstructible data among network resources. The method may comprise identifying, at a transmitting network resource, data to be securely transmitted across a network to a receiving network resource; applying a splitting scheme to the data to form one or more data portions; obtaining a unique session identifier; selecting a distribution scheme for the one or more data portions, the distribution scheme comprising one or more constituent network nodes, the one or more constituent network nodes each lacking access to the selected distribution scheme and each having: an associated network address, and a cryptographic key; accessing one or more cryptographic keys maintained by the transmitting network resource; encrypting, using the one or more cryptographic keys maintained by the transmitting network resource, the one or more data portions to form a plurality of corresponding encrypted blocks, wherein the one or more constituent network nodes are configured to: decrypt at least a portion of one or more of the plurality of encrypted blocks, and route the decrypted portion of the one or more of the plurality of encrypted blocks to either another of the one or more constituent network nodes or to the receiving network resource; and transmitting, according to the selected distribution scheme, the one or more of the plurality of encrypted blocks to one or more of the constituent network nodes, en route to the receiving network resource; wherein the receiving network resource is configured to, upon obtaining the one or more data portions, and with reference to the unique session identifier, combine and validate the one or more data portions.

According to a disclosed embodiment, obtaining the unique session identifier includes generating the unique session identifier.

According to a disclosed embodiment, the unique session identifier is included in at least one of the plurality of encrypted blocks.

According to a disclosed embodiment, the receiving network resource is further configured to, upon receiving each of the plurality of encrypted blocks, attempt to combine and validate the one or more data portions.

According to a disclosed embodiment, the data to be securely transmitted comprises at least one of: a secret, a credential, sensitive data, software code, or a software update.

According to a disclosed embodiment, the distribution scheme is based on a network security policy.

According to a disclosed embodiment, the network security policy considers a security status of a universe of network nodes in order to select the one or more constituent network nodes.

According to a disclosed embodiment, the network security policy considers an activity status of a universe of network nodes in order to select the one or more constituent network nodes.

According to a disclosed embodiment, the selected distribution scheme comprises a plurality of distinct transport paths, each of the plurality of distinct transport paths including a plurality of the one or more constituent network nodes.

According to a disclosed embodiment, each of the plurality of distinct transport paths is assigned to one of the one or more data portions in the selected distribution scheme.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
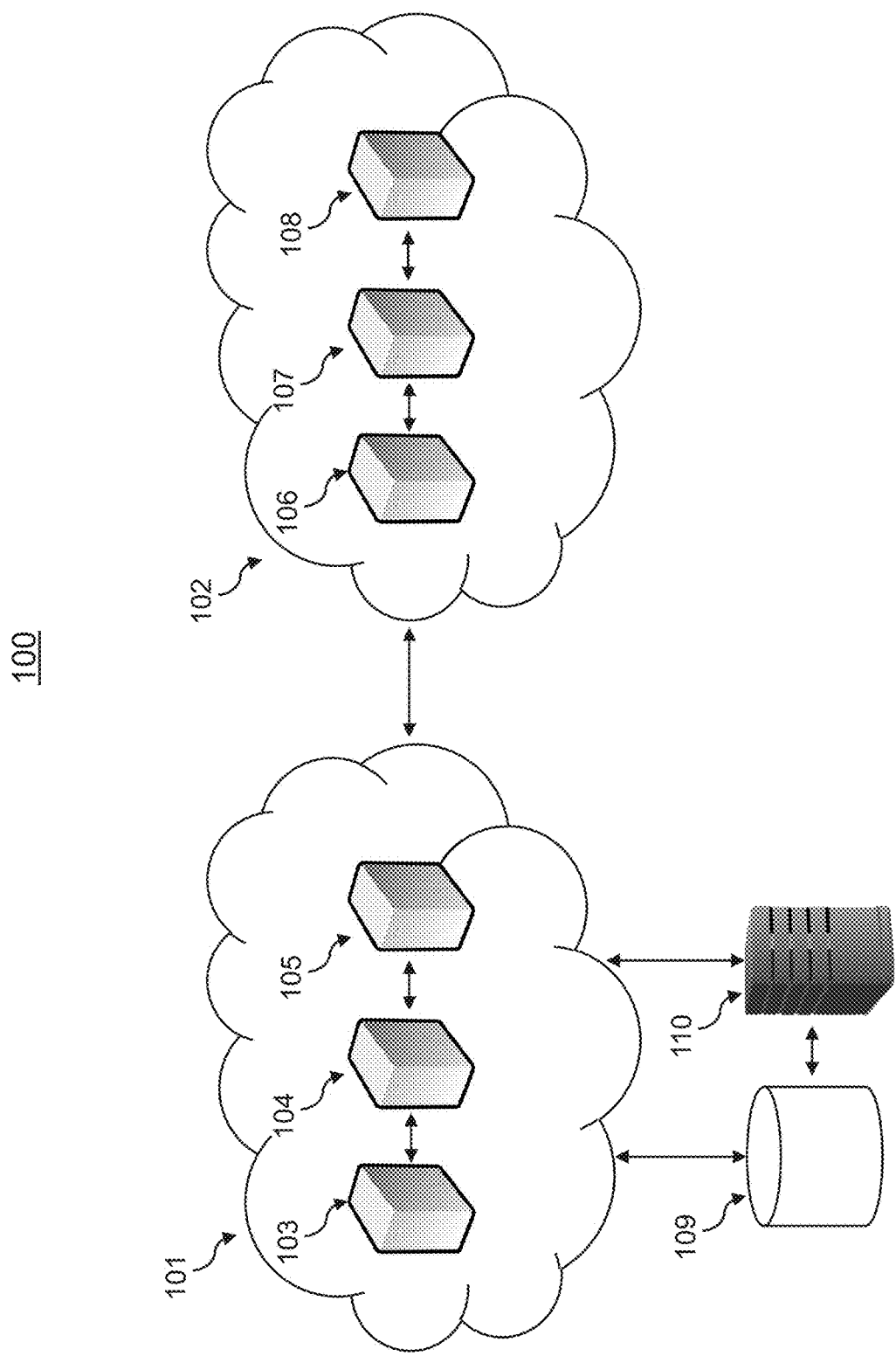
FIG. 1 is a block diagram of an exemplary system environment in which techniques for distributed transmission of divisible and reconstructible data among network resources may be practiced, in accordance with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques of distributed transmission of divisible and reconstructible data among network resources described herein offer several important technical advantages over conventional transmissions of data, code, or other content. In contrast to conventional techniques, which allow for communications to be intercepted and/or analyzed by intermediary entities along a transmission path, the present techniques prevent such intermediary entities from discovering any meaningful information that may be used to orchestrate attacks. For example, the described techniques may allow for transmission of data, code, or other content according to transmission paths where the transmitted content is split into one or more segments and distributed to an endpoint via several intermediary resources. The intermediary resources may be unable to decrypt the content, may be unaware of the number of segments being transmitted, may be unaware of the source of the content, and may be unaware of the identity of the intended endpoint recipient. Thus, even if an attacker is able to compromise one or more of the intermediary resources, the attacker will still have no way of accessing the content being transmitted or other useful information for planning attacks (e.g., the size of the content being transmitted, the path of the transmission, the identities of the sender and recipient, etc.).

According to disclosed techniques, content may be transmitted from a transmitting resource where only the transmitting resource itself knows the transmission pathway, the number of resources in the pathway, the sequence of the pathway, and the identity of the endpoint recipient. Indeed, for added security, the transmitting resource may be configured to forget (e.g., delete) this information upon transmission. Some disclosed embodiments further permit transmission of content across intermediary resources associated with or owned by different entities. For example, one company transmitting data may have the data transmitted across its own resources, across resources of other companies, or a combination of both. Because no entity owning or operating the intermediary resources will be able to discover meaningful information about the content being transmitted, transmissions of this manner will remain highly secure.

Reference will now be made in detail to the disclosed embodiments, examples of which are illustrated in the accompanying drawings.

FIG. 1 illustrates an exemplary system 100 for distributed transmission of divisible and reconstructible data among network resources. As illustrated in FIG. 1, system 100 may include one or more of networks 101 and 102, each of which may include one or more network resources 103-105 and 106-108. Of course, in some embodiments, there may be only one network (e.g., network 101), while in other embodiments there may be three or more networks involved in practicing the techniques described below. Similarly, networks 101 and 102 may each include fewer or additional network resources than illustrated in FIG. 1.

Networks 101 and 102 may each take various forms, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols.

Network resources 103-108 may also be various different types of network-accessible machines or applications. Examples of network resources 103-108 may include, for instance, business applications (e.g., word processing or spreadsheet applications, database applications, document management or archiving applications, etc.), social media applications (e.g., chat applications, content sharing applications, discussion or commentary applications, etc.), email applications, Internet browser applications, IoT applications (e.g., sensors, monitoring tools, data collection tools, smart home appliances, robotic devices, fully or partially autonomous vehicles, etc.), or various other types of applications.

In some embodiments, network resources 103-108 may include discrete applications running on dedicated computing hardware (e.g., a dedicated server, a particular IoT device, etc.), while in other embodiments network resources 103-108 may be virtualized (e.g., virtual machines, container instances, serverless code, etc.). In order to communicate over networks 101-102, network resources 103-108 may each have one or more network adaptors or communication devices and/or interfaces (e.g., WiFi, Bluetooth®, RFID, NFC, RF, infrared, etc.) to communicate with each other and other resources in networks 101-102. In some embodiments, content being transmitted through networks 101-102 may be addressed to a recipient network resource. The recipient network resource may be one of network resources 103-108, or may alternatively be a network resource in a separate network.

Also illustrated in FIG. 1 are transmission manager 110 and database 109. As described further below, transmission manager 110 may be configured to orchestrate the secure and distributed transmission of data, application code, credentials, or other content through one or more of network resources 103-108 to a recipient network resource. In some embodiments, transmission manager 110 is a machine or application separate from network resources 103-108 and the recipient network resource. In other embodiments, transmission manager 110 may be integrated into one or multiple of network resources 103-108 (e.g., as a software application, agent, etc.). For example, in such embodiments, the network resources 103-108 themselves may be able to perform the functionality described below in terms of data splitting, data path selection, and data transmission. In embodiments where transmission manager 110 is a server separate from network resources 103-108, database 109 may also be separate from network resources 103-108. On the other hand, where transmission manger 110 is integrated into one or more of network resources 103-108, database 109 may either be local to the network resources 103-108 (e.g., stored on a hard drive, RAM, ROM, Flash memory, etc.) or external to network resources 103-108. Further, transmission manager 110 may be implemented as a proxy server designed to intercept communications from a transmitting resource intended for a receiving resource, and perform the techniques of data splitting and encryption discussed below.

In the embodiments discussed further below, database 109 may store various data and applications involved in transmission manager 110's secure and distributed transmission of data. For example, as discussed below, database 109 may include applications configured to perform encryption of data (e.g., using algorithms such as Rivest-Shamir-Adleman (RSA), Transport Layer Security (TLS), S/MIME, PGP, GPG, DES, etc.). Further, database 109 may include applications configured to perform data splitting, sharding, or partitioning (e.g., Shamir's secret-sharing scheme, Blakley's scheme, random splitting, or various other types of schemes), or to create fictive (e.g., null or nonce) data portions. Additionally, database 109 may include applications for creating (e.g., randomly, semi-randomly, traffic load-based, or security policy-based) data transmission paths among one or more of network resources 103-108 en route to a receiving network resource. Further, database 109 may include identifying information associated with network resources 103-108 (e.g., network names, IP addresses, MAC addresses, cryptographic information, etc.) which may be used in determining a number of pieces into which data should be split, how each piece of data should be encrypted, and the sequence or path of distribution for the pieces.

Figure 2:
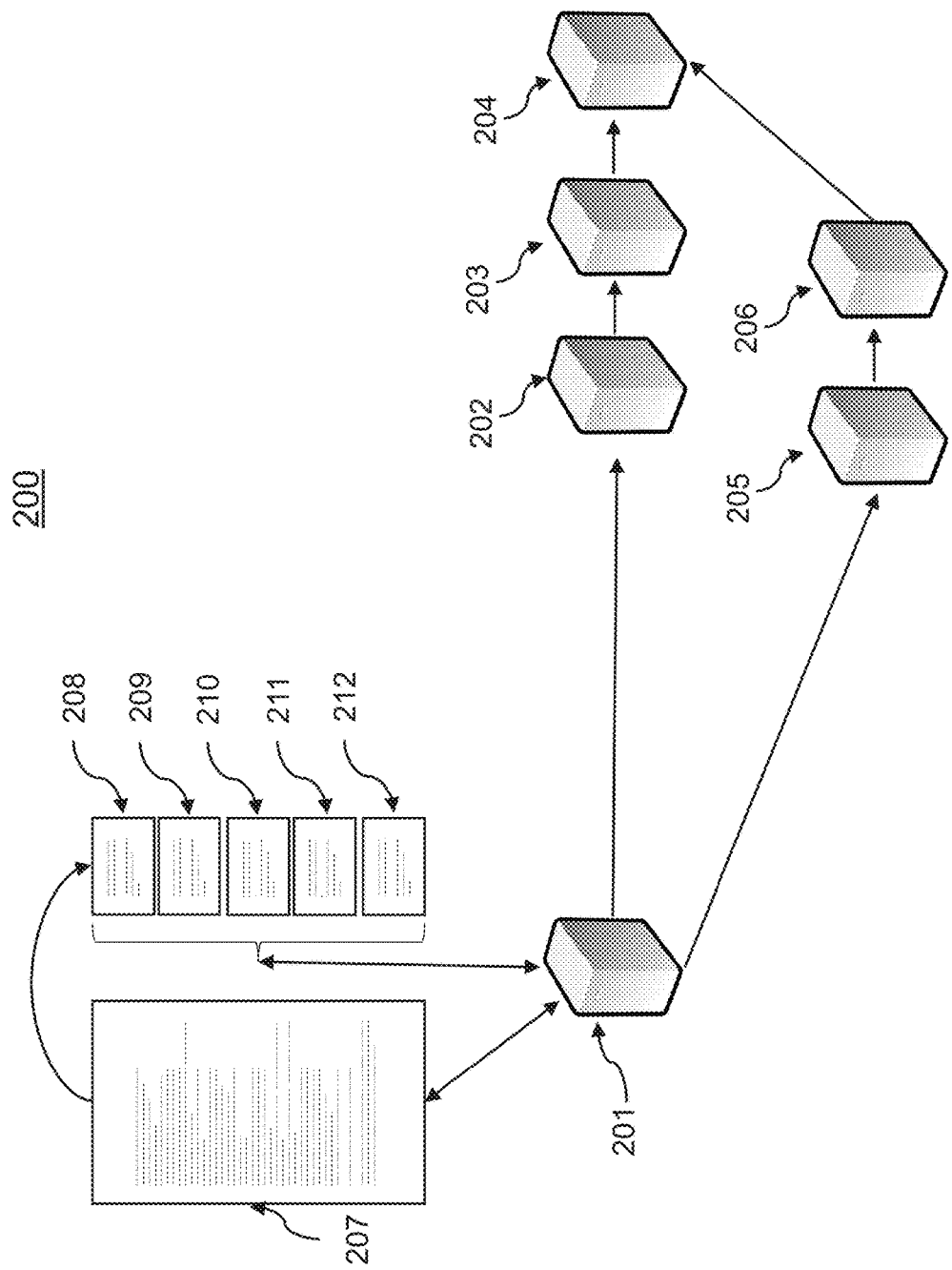
FIG. 2 is a block diagram of an exemplary system environment in which data may be split into portions and transmitted along a distribution path to a recipient node, in accordance with disclosed embodiments.

FIG. 2 is a block diagram of an exemplary system 200 in which data 207 may be split into portions 208-212 and transmitted along a distribution path to a recipient node 204. Consistent with the discussion above regarding FIG. 1, system 200 may include one or more network resources or nodes 201-206. In this example, node 201 may itself function as the transmission manager (e.g., transmission manager 110 of FIG. 1). According to a data distribution scheme being implemented for transmitting data 207 to the receiving node 204, data 207 may be split into a plurality of portions 208-212, and each portion 208-212 may be transmitted to one or more of network resources or nodes 202-206 en route to the receiving node 204. For example, as shown data portions 208-210 are transmitted to node 204 through nodes 202 and 203, while data portions 211-212 are transmitted to node 204 through nodes 205 and 206.

The data 207 may be various types of data, such as digital information, application code, serverless code, credentials or secrets, software updates, network configuration data, policy controls, audit log or activity log data, etc. As an illustration, in some embodiments data 207 may be a user's password being supplied to access a secure service (e.g., secure server, application, database, website, intranet, etc.). In accordance with FIG. 2, the password may be split into two or more portions 208-212 and delivered to an endpoint resource 204 configured to verify the password. As another example, data 207 may be serverless code (e.g., AWS Lambda™ serverless code, IBM Cloud™ serverless code, Azure™ serverless code, etc.) being transmitted from a developer (e.g., in a DevOps environment) to a location in a cloud network (e.g., AWS™, IBM Cloud™, Azure™, etc.) where the serverless code will be instantiated or executed. As a further example, data 207 may be a sensitive document (e.g., medical record, financial document, personal document, etc.) being uploaded or transmitted to an endpoint server 204. As yet another example, data 207 may be a server patch being transmitted to an endpoint server 204 in need of a software update. Numerous other types of data or code may be represented by data 207. Notably, in accordance with system 200, the data 207 may be transmitted through nodes 202-206 to the recipient node 204 on a zero-trust basis, where none of the nodes is configured with an established or preestablished trust relationship with others of the nodes. Indeed, as discussed above, none of nodes 202-206 may be configured to determine (or be capable of determining) how many pieces data 207 has been split into, what the endpoint or receiving node is, or the identity of the transmitting node (e.g., transmission manager 110 of FIG. 1), before performing a hash comparison as described below. Indeed, through these techniques, as discussed further below, data 207 may be transmitted through nodes 202-206 even in situations where nodes 202-206 are maintained or owned by multiple different organizations or enterprises. The data 207 will be securely transmitted to the endpoint 204 and no intermediary node will be able to understand the contents of data 207 or even its file or metadata attributes.

Figure 3:
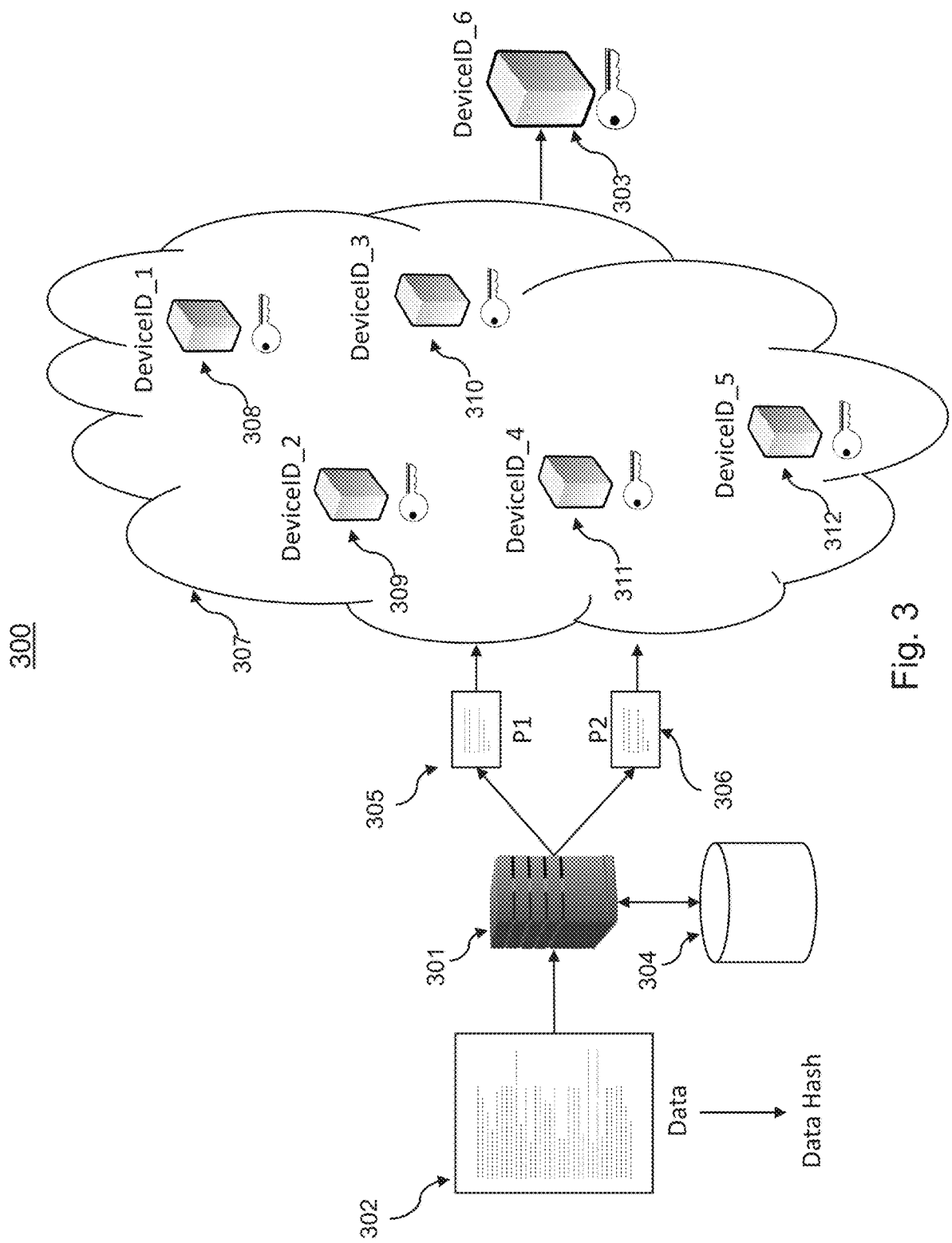
FIG. 3 is a block diagram of an exemplary system environment in which data portions may be encrypted and transmitted along a distribution path to a recipient node, in accordance with disclosed embodiments.

FIG. 3 is a block diagram of an exemplary system 300 in which data portions may be encrypted and transmitted along a distribution path to a recipient node. As illustrated in FIG. 3, transmission manager 301 (e.g., similar to transmission manager 110) may operate to access data 302 (e.g., similar to data 207), split the data 302 into two (or more) portions, P1 305 and P2 306, and transmit the data portions 305-306 along a distribution path en route to a receiving network resource 303.

Transmission manager 301 may access database 304 (e.g., integrated into transmission manager 301 or separate) to implement these operations. For example, in order to access data 302, in some implementations transmission manager 301 may generate a user interface (e.g., browser or other application) where a user may be able to identify data 302 for transmission. According to such techniques, users may select content (e.g., word processing documents, images, video files, credentials or secrets, application code, etc.) to be transmitted to receiving node 30. Alternatively, transmission manager 301 may be configured to automatically transmit data of certain types or upon certain conditions. For example, transmission manager 301 may be configured to transmit data 302 whenever a certain type of data (e.g., a software patch) is detected or received by transmission manager 301. Similarly, transmission manager 301 may be configured to transmit data 302 whenever a threshold or condition is set (e.g., whenever a value in data 302 exceeds a threshold number, whenever a particular value or parameter in data 302 is present, etc.). In accordance with these embodiments, data 302 to be transmitted may be selected and identified locally by transmission manager 301, or may be selected and identified such that it is then provided to transmission manager 301 for transmission.

Database 304 may also implement applications to perform operations such as data splitting, sharding, or partitioning. These operations may be performed by applications that implement, for example, Shamir's secret-sharing scheme, Blakley's scheme, random splitting, or various other types of schemes. Additionally, database 304 may include applications configured to perform encryption of data 302 and/or data portions following the splitting or sharding (e.g., based on Shamir's secret-sharing scheme, Blakley's scheme, random splitting, or various other types of schemes etc.). Further, database 304 may include applications for creating (e.g., randomly, semi-randomly, traffic load-based, or security policy-based) data transmission paths among one or more of network resources 103-108 en route to a receiving network resource. In some embodiments, database 304 may also include applications configured to create fictive (e.g., null, nonce, or decoy) data portions. These data portions may be used in some situations in combination with real or actual data elements in order to detect attacks or enhance the difficulty in attacking distributed data. In addition, database 304 may include identifying information associated with network resources 308-312 and receiving network resource 303 (e.g., network names, IP addresses, MAC addresses, cryptographic information, etc.) which may be used in determining a number of pieces into which data should be split, how each piece of data should be encrypted, and the sequence or path of distribution for the pieces.

As illustrated in FIG. 3, data 302 is split into two portions, P1 305 and P2 306, and the two portions are transmitted according to a transmission pathway through network 307, which includes multiple intermediary nodes 308-312 along the pathway to recipient node 303. In some embodiments, database 304 may store information such as the Device IDs (e.g., Device ID_1 through DeviceID_6), as well as address information (e.g., IP address, MAC address, etc.) associated with nodes 308-312 and 303. The Device IDs may be preconfigured and static, or unique and/or dynamic identifiers (e.g., Globally Unique Identifiers, GUIDs, or universally unique identifiers, UUIDs). Further, some or all of nodes 308-312 and 303 may be configured to decrypt data pieces 305 or 306 that they receive. For example, nodes 308-312 and 303 may have locally stored decryption keys (or may access decryption keys externally) for use in decrypting data portions 305 and 306. The decryption keys may be asymmetric cryptographical keys (e.g., part of a public/private key pair) and developed based on an algorithm such as Diffie-Hellman (DH), Digital Signature Standard (DSS), Rivest-Shamir-Adleman (RSA), or various others. In such situations, the corresponding encryption key from the pair may be maintained by the transmission manager 301. Further, the decryption keys may be one or more symmetric keys based on a symmetric key algorithm such as Data Encryption Standard (DES), Triple DES (TDES), Advanced Encryption Standard (AES), CAST-128, or others. Similarly, instances of the symmetric keys may be maintained by the transmission manager 301 for use in encryption of data 302 or data portions 305-306. In some embodiments, the decryption keys are generated or accessed by the transmission manager 301 and provided to the nodes 308-312 and 303. In other embodiments, the decryption keys are generated by the nodes 308-312 and 303 and then registered with the transmission manager 301 (e.g., stored in database 304). In further embodiments, the decryption keys are made available to nodes 308-312 and 303 from a secure credential repository (not shown), such as a network vault (e.g., CyberArk™ Vault).

In operation, system 300 may involve transmission manager 301 receiving or otherwise identifying data 302 to be transmitted to recipient resource 303 (DeviceID_6). As discussed above, this may involve transmission manager 301 receiving user input (e.g., via a user interface) selecting data 302, an automatic selection of data 302 (e.g., based on a detected type of data 302 or trigger condition satisfied by data 302), or other techniques. Once data 302 has been identified, transmission manager 301 may compute a hash of the data. Various techniques may be used to compute the hash, such as perfect hashing, universal hashing, or various others. The hashing algorithm and output of the hashing may be stored by transmission manager 301 (e.g., in database 304).

Additionally, transmission manager 301 may operate to split data 302 into two (or more) data portions, P1 305 and P2 306. In some embodiments, the splitting or partitioning is performed according to preset parameters (e.g., split the data 302 into a certain number of portions). In further embodiments, the number of portions may be based on the sensitivity of the data 302 being transmitted, or whether the data 302 will be traversing network resources associated with different entities or organizations. For example, if data 302 is sensitive (e.g., confidential secrets, sensitive application code, etc.) or if data 302 is to traverse networks of different enterprises, transmission manager 301 may determine to split data 302 into a greater number of portions for added security. Further, in some embodiments the splitting may be based on particular sharding or splitting algorithms, such as Shamir's secret-sharing scheme, Blakley's scheme, or various other types of schemes. In additional embodiments, a user may select a level of sensitivity of data 302 and/or a number of portions into which data 302 should be split. In further embodiments, as noted above, some or all of the data portions may be fictive (e.g., null or nonce) data portions in some transmissions. In such embodiments, such data portions may be disregarded when data elements are later joined, or may be considered and required to successfully perform a hash comparison, as described below.

Transmission manager 301 may further generate a unique and random session identifier associated with the transmission of data 302 to endpoint 303. In some embodiments, the session ID may be randomly generated, semi-randomly generated, etc. For example, the session ID may be, in some embodiments, a GUID or UUID. The session ID may be uniquely associated with the particular transmission of data 302 that transmission manager 301 is to perform.

Transmission manager 301 may also select a distribution path or route for data 302 to travel en route to receiving resource 303. As discussed above, transmission manager 301 may be configured to randomly select the transmission path. For example, having access to database 304 storing information regarding various network nodes (e.g., including nodes 308-312 and 30, as well as potentially numerous other available nodes), transmission manager 301 may randomly select among the entire universe of available nodes, among a subset of the nodes, etc. In some embodiments, the universe of available nodes or the subset may be chosen based on information regarding the current availability status of individual nodes, past transmission activity of individual nodes, geographic locations of individual nodes, relative proximity between individual nodes and either the transmission manager 301 or the endpoint 303, or various other factors. In further embodiments, the transmission path may be configured by an administrator or user, and thus may not be random. Further, in some embodiments the transmission path may be based on network traffic and load balancing considerations. In additional embodiments, administrators or users may be allowed to choose whether or not data 302 should be transmitted only among their organization's or enterprise's network nodes, or alternatively whether data 302 should traverse nodes of other organizations or enterprises as well.

In accordance with FIG. 3, transmission manager 301 may select, for example, to transmit data 302 according to the following routes for each of pieces P1 305 and P2 306:

Route for Piece P1: DeviceID_1 308→DeviceID_3 310→DeviceID_2 309→DeviceID_1 308→DeviceID_6 303

Route for Piece P2: DeviceID_4 311→DeviceID_6 303

According to this distribution path, both of P1 305 and P2 306 are transmitted to DeviceID_6 303, although using different distribution paths in network 307. Further, as discussed below, different encryption techniques may be employed for P1 305 and P2 306 en route to DeviceID_6 303.

Figure 4:
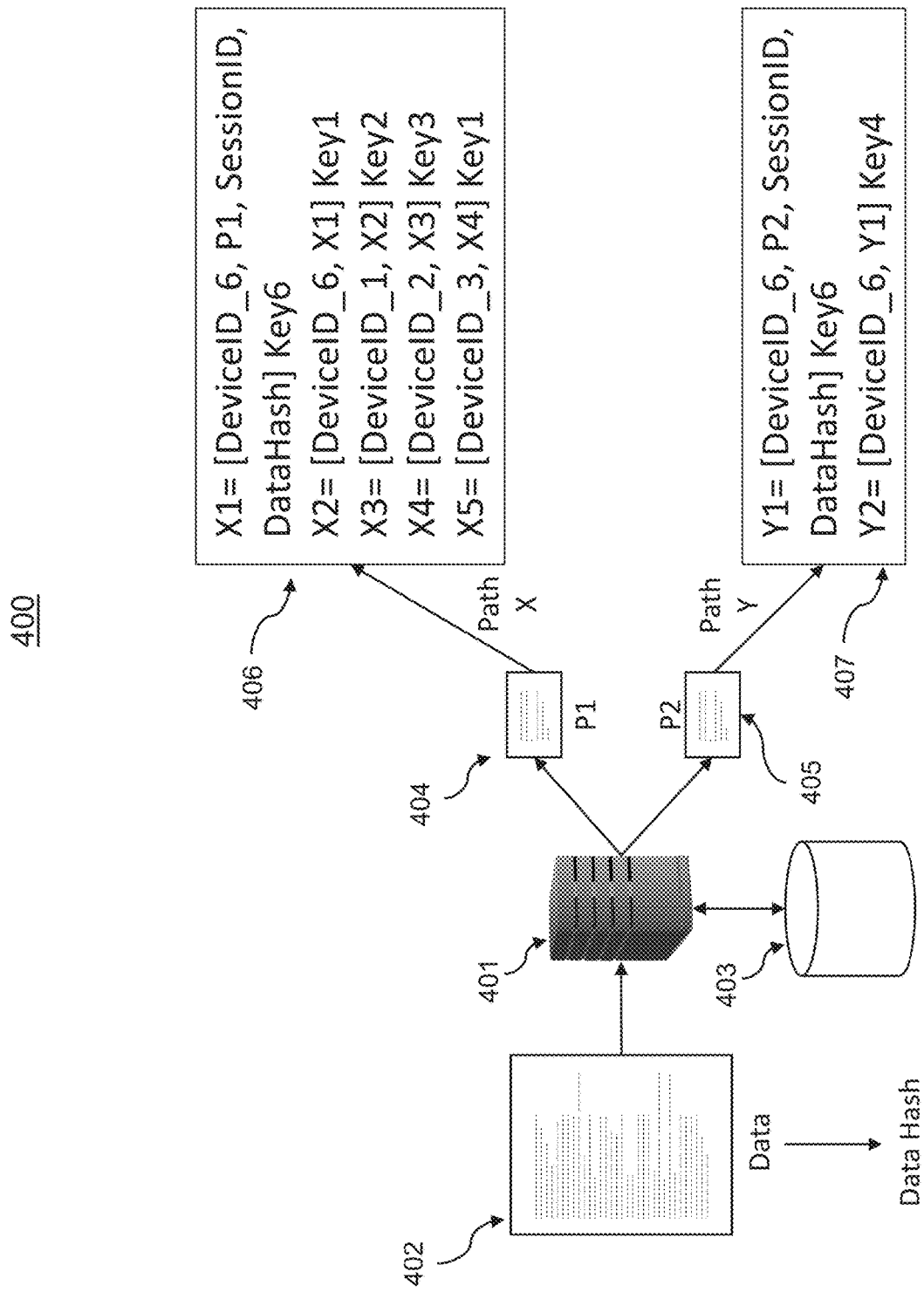
FIG. 4 is a block diagram of an exemplary system environment where data portions have encryption applied according to a selected distribution path en route to a recipient node, in accordance with disclosed embodiments.

In some embodiments, transmission manager 301 may further apply an encryption scheme to the data portions P1 305 and P2 306 before they are transmitted in their respective paths. An exemplary encryption scheme is depicted in FIG. 4, which is substantially similar to FIG. 3. For example, elements 401, 402, 403, 404, and 405 in FIG. 4 may correspond, respectively, to elements 301, 302, 304, 305, and 306 of Figure.

As shown in FIG. 4, encryption scheme 406 may be applied to data portion P1 404, which travels in Path X, and encryption scheme 407 may be applied to data portion P2 405, which travels in Path Y. Consistent with the discussion above, Path X may include DeviceID_1 308→DeviceID_3 310→DeviceID_2 309→DeviceID_1 308→DeviceID_6 303, and Path Y may include DeviceID_4 311→DeviceID_6 303, with respect to FIG. 3.

According to encryption scheme 406, "X" indicates the encrypted data that is passed in Path X, and in encryption scheme 407, "Y" indicates the encrypted data that is passed in Path Y. For example, X5 indicates the encrypted data first reaching DeviceID_1 308, which includes encrypted versions of X4 and an identification of DeviceID_3, the encryption having been performed by transmission manager 401 with a key corresponding to Key1 maintained by DeviceID_1 308. Because DeviceID_1 308 stores (or has access to) a decryption Key 1, it is able to decrypt the received encrypted data X5, thus revealing X4 and the identity or address of the next node in the pathway (DeviceID_3 310). Next, DeviceID_1 308 transmits X4 to DeviceID_3 310, which DeviceID_3 310 decrypts using its decryption Key 3 to reveal X3 and the identity or address of the next node in the pathway, DeviceID_2 309. Following this decryption, DeviceID_3 310 sends the decrypted transmission X3 to DeviceID_2 309, pursuant to the pathway. What DeviceID_2 309 receives as a transmission, X3, is an encrypted block, which DeviceID_2 309 can decrypt using its decryption key to reveal X2 and the next node in the pathway, DeviceID_1 308. The decrypted message, X2, is then sent from DeviceID_2 309 to DeviceID_1 308, which in turn is able to decrypt the block X2 it receives using its decryption key, Key 1, to reveal X1 and the next node in the pathway, which in this example is the receiving or endpoint node, DeviceID_6 303. Once DeviceID_6 303 decrypts the message X1 using its decryption key, Key 6, it reveals data including the previously generated Session ID (e.g., as generated by the transmission manager 401) and data hash (e.g., as computed by transmission manager 401 on data 402.

Similarly, according to encryption scheme 407, DeviceID_4 311 may receive Y2, which includes data portion P2 405 as encrypted by transmission manager 401. Because the block Y2 received by DeviceID_4 311 was encrypted by transmission manager 401 using a cryptographic key corresponding to Key 4 maintained by (or accessible to) DeviceID_4 311, DeviceID_4 311 is able to decrypt the block Y2, thus revealing Y1, which includes the next node in the pathway, DeviceID_6 303. In this example, the next node, DeviceID_6 303, is the endpoint or receiving node of P2 405. DeviceID_6 303 is then able to receive Y1, and decrypt Y1 using its key, Key 6, to yield the session ID and data hash.

As can be seen from the above discussion of encryption scheme 406 and encryption scheme 407, transmission manager 401 may be configured to add layers of encryption to both P1 404 and P2 405 corresponding to the number of nodes, and the particular selected nodes, in the transmission pathway of data 402 to the endpoint or receiving node. The data portions may, for example, first be encrypted using a cryptographic key corresponding to the receiving node (e.g., DeviceID_6 303), and next that encrypted block may be encrypted using a cryptographic key of the next-to-last node in the pathway (e.g., DeviceID_1 308 for P1 404, and DeviceID_4 311 for P2 405). Further, that encrypted block may be again encrypted by transmission manager 401 corresponding to the second-from-last node (e.g., DeviceID_2 309 for P1 404). In turn, working backwards in the transmission path, that block may be encrypted by transmission manager 401 according to the third-from-last node (e.g., DeviceID_3 310), and then encrypted according to the fourth-from-last node (i.e., the first node in the path) (e.g., DeviceID_1 308). According to these techniques, when transmission manager 401 beings the transmission of P1 404 and P2 405, the initial transmission may include multiple layers of encryption, each of which may be decrypted to finally reveal the session ID and data hash destined for the receiving node (e.g., DeviceID_6 303). Each node in the pathway decrypts a layer of the encryption, thus contributing to eventually reaching the data portion, session ID, and data hash.

According to the above techniques, when a particular node decrypts a received message to reveal a DeviceID which matches its own DeviceID, the node may be configured to attempt to join the data pieces it has received for a particular Session ID. For example, consistent with the above examples, when DeviceID_6 303 has received P1 404 according to Path X, and has also received P2 405 according to Path Y, DeviceID_6 303 may determine from the communications it received (i.e., X1 and Y1) that they include a DeviceID corresponding to DeviceID_6 303 (i.e., DeviceID_6 303). When DeviceID_6 303 determines that its DeviceID is referenced, it may attempt to join all data portions it has received (i.e., P1 404 and P2 405) according to their corresponding SessionID (i.e., the SessionID contained in X1 and Y1). Of course, in some embodiments, DeviceID_6 303 may receive additional data portions corresponding to different transmission pathways. Each of these data portions will have its own unique SessionID if it is part of a different data transmission. Thus, DeviceID_6 303 will look for data portions it has received (i.e., P1 404 and P2 405) having a SessionID in common.

Once such data portions are identified, DeviceID_6 303 may attempt to join the data portions. For example, if there are only two data portions (i.e., P1 404 and P2 405), there may be two possible combinations, P1:P2 and P2:P1. In other embodiments, where there may be more than two data portions, there of course may be more than two ways to join the data portions. For each attempted joinder of the data portions, DeviceID_6 303 may compute a hash of the joined data portions. This hash may then be compared to the data hash included as part of X1 and Y1, which was generated originally by transmission manager 401. As an example, if data 401 has been split in the form of P1:P2, an attempted joinder of P2:P1 would produce a hash different from the original hash computed by transmission manager 401, and thus would not match. On the other hand, an attempted combination of the data portions of P1:P2 would produce a hash identical to the computed hash generated by transmission manager 401 and included in X1 and/or Y1, and thus a comparison with this hash would produce a match. Based on a successful comparison of a hash computed by DeviceID_6 303 and a hash found in X1 and/or Y1, DeviceID_6 303 may be able to confirm that it is the intended recipient of data 402, that it has successfully received all portions of data 402, and that it has correctly recreated data 402 from the received portions. Following such a successful comparison, in some embodiments DeviceID_6 303 may generate a report indicating its success (e.g., a report transmitted to transmission manager 401 or another resource).

As an illustration of this hash-verification process, DeviceID_6 303 may hold the following metadata:
Symmetric Key (AES-256): 3677397A24432646294 A404E635266556A586E3272357538782 14125442A 472D
Unique Device ID: a47f32c6-269d-4b72-baef-7e395 d54ddcc When DeviceID_6 303 receives an encrypted data piece from a particular network node, the encrypted data may include:
Encrypted Data: olth8oF8OmXRarEoQRtct8z0BQ4EYLQzQH5Mr0/6O Gp7+Ee7kTh6ngAx WW9sQZ5sUoVO1t/QiSG2 Tn zzYzwemVURkfEn2/1y5hpunEyUeQrA3jP+W4c/Vw ZoPhTGmrTjK2CTv23wSj/ViwUFgT4QWBHFLVO GuISLA8i4iKZc pOC9vmFcGq+Xycsfe3hh+jxU9 W7 kSRC19ACAzla/Y3bing==

As discussed above, DeviceID_6 303 may attempt to decrypt this data using its symmetric decryption key, Key 6, to reveal the following:

Decrypted Data: a47f32c6-269d-4b72-baef-7e395d54 dd cc, 1234,364d58f2-fd36-41d6-9543-68d90260d448,e f 7 97c8118f02dfb649607dd5d 3f8c7623048c9c 063d 532cc 95c5ed7a898a64f In this decrypted data, the following elements may be present:
Device ID: a47f32c6-269d-4b72-baef-7e395d54ddcc
Data Piece: 1234
Session ID: 364d58f2-fd36-41d6-9543-68d90260d448
Data Hash: ef797c8118f02dfb649607dd5d3f8c 762304 8c9c063d532cc95c5ed7a898a6 4f Following this decryption, DeviceID_6 303 may check whether the Device ID it received matches its own Device ID. In this example, there is a match, since both Device IDs are: a47f32c6-269d-4b72-baef-7e395d54ddcc.

Next, DeviceID_6 303 may compute a hash (e.g., using Sha-256) on the Data Piece, 1234. Here, the computed hash may be 03ac674216f3e15c761ee1a5e255f0679536 23c8b38 8b4459e13f978d7c846f4. In this situation, the received Data Hash does not match the computed hash. Accordingly, in this situation DeviceID_6 303 will not confirm that it has received all portions of data being transmitted. For example, this may indicate that DeviceID_6 303 has received some, but not all, of the data portions being transmitted for the Session ID.

In some embodiments, DeviceID_6 303 may then receive another data piece (e.g., the second of two data pieces being transmitted). Here, the second data piece may include the following data:
Encrypted Data: olth8oF8OmXRarEoQRtct8z0B Q4EYL QzQH5Mr0/6OGofInCBhjh9bEYtG6 YLipzFD4lCeP7mAZDjwSP926fFbWhm84vcWZGA FUChRrUenhHVIlnlf5q JKTTNZqEzJ/y7OrCZiE/zS JPXQWKklxZQyGAKM53Zm rkPv6kM K64QT7 35 MKfWgoksvdTDrGdyqabAXQq11ImnYdUjTkOAB T2GPw==

Next, DeviceID_6 303 may attempt to decrypt this encrypted data using its symmetric key. The decryption may produce the following:
Decrypted Data: a47f32c6-269d-4b72-baef-7e395d54dd cc,5678,364d58f2-fd36-41d6-9543-68d90260d448,ef 797c8118f02dfb649607dd5d3f8c7623048c9c063d53 2cc 95c5ed7a898a64f In this decrypted data, the following elements may be present:
Device ID: a47f32c6-269d-4b72-baef-7e395d54ddcc
Data Piece: 5678
Session ID: 364d58f2-fd36-41d6-9543-68d90260d448
Data Hash: ef797c8118f02dfb649607dd5d3f8c 623 048 c9c063d532cc95c5ed7a898a6 4f Here, as with the first received data portion, DeviceID_6 303 may check wither the received Device ID for the second data portion matches the Device ID of DeviceID_6 303 itself. In this example, there is a match. Based on this, DeviceID_6 303 may also confirm whether the Session ID of the second data piece is the same as the Session ID of the first data piece. That is also a match in this example. Based on the Session ID match, DeviceID_6 303 may attempt to join all data pieces it has received for that particular Session ID. In this example, there are two received data pieces.

In a first attempted joining of the two data pieces, DeviceID_6 303 may join them as follows: 5678+1234, or 56781234. DeviceID_6 303 may then compute a hash on this attempted joinder of the data portions. The hash may equal, for example: 7931ce47a090e31cdb1d88 644a5d74ae6d9ed147d1788de26aca44191f324f8e. Based on that computed hash, DeviceID_6 303 may confirm that its computed hash does not equal the hash provided to it as part of the encrypted data that it decrypted. Because the hash does not match, DeviceID_6 303 determines that it should try a different attempted joinder of the two data portions. According to the second attempted joinder, 1234+5678, or 12345678, DeviceID_6 303 again computes a hash. This time, the computed hash of 12345678 is ef797c811 8f0 2dfb649607dd5d3f8c7623048c9c063d532cc95c5ed7a898 a64f, which is determined to be an identical match to the received data hash. Because the two hashes are matched and identical, DeviceID_6 303 determines that it is the receiving node, that it has received all portions of the transmitted data, and that the final transmitted data is 12345678.

Figure 5:
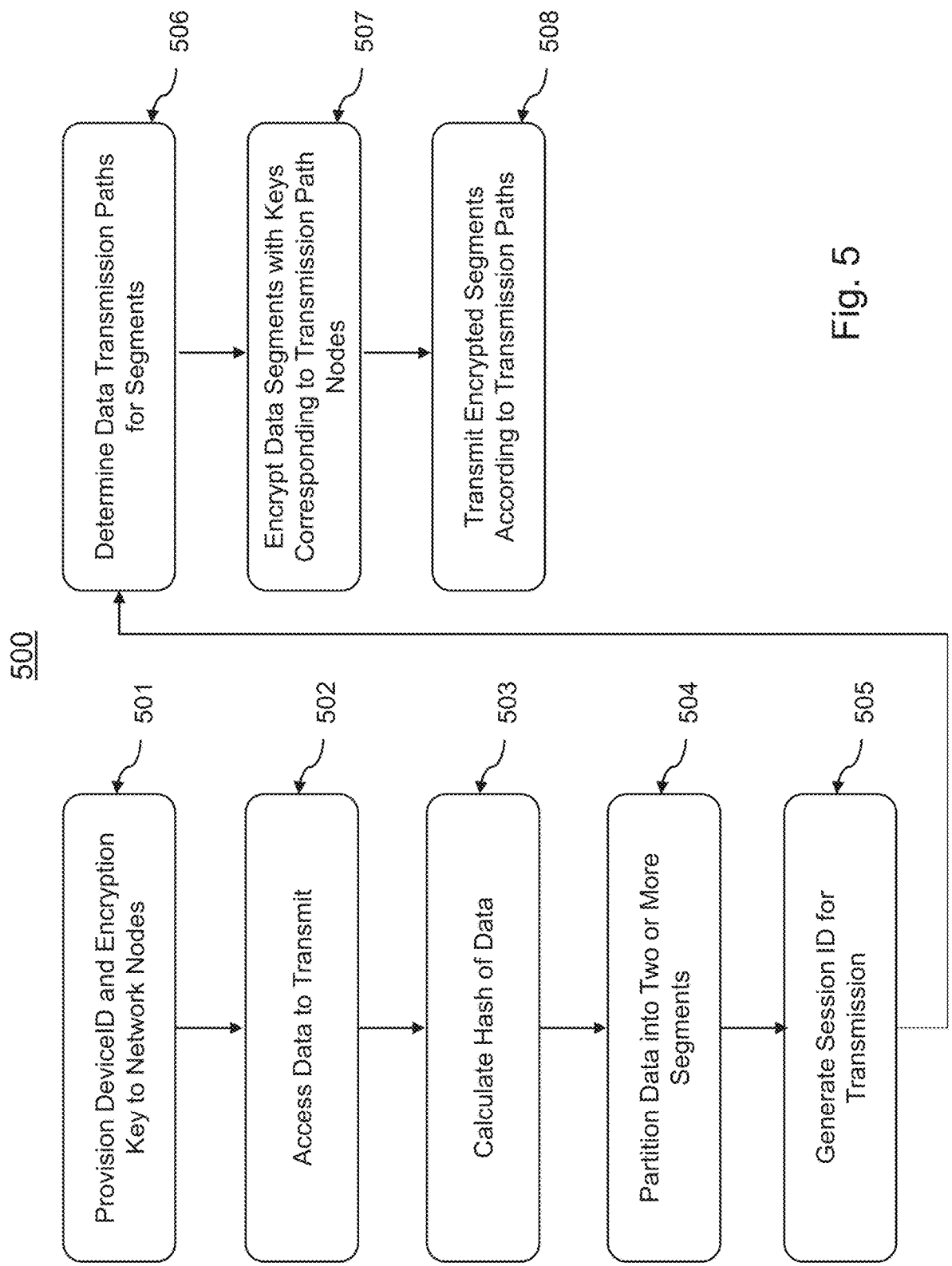
FIG. 5 is a flowchart depicting an exemplary process for distributed transmission of divisible and reconstructible data among network resources, in accordance with disclosed embodiments.

FIG. 5 is a flowchart depicting an exemplary process 500 for distributed transmission of divisible and reconstructible data among network resources. Consistent with the disclosure above, process 500 may be practiced in the system environments of FIGS. 1-4. For example, in some embodiments, process 500 may be implemented with a transmission manager (e.g., transmission manager 110, 201, 301, 401). To implement method 500, the transmission manager may access internal memory or external memory (e.g., database 109, 304, 403).

According to process 500, operation 501 may include provisioning DeviceIDs and encryption keys to network resource nodes that are configured to potentially participate in distributed data sharing. In some embodiments, this may occur when the transmission manager is initially implemented. For example, a pool or set of participating network nodes may be identified, such that varying different subsets of the pool or set may be selected by the transmission manager for particular different transmissions of data portions. In some embodiments, the pool or set may be identified on a continuous or periodic basis according to factors such as they real-time operational status (e.g., available or busy), their health (e.g., health and uncompromised or potentially insecure or compromised), their geographic location or proximity to the transmission manager and/or receiving node, or various other factors. Data regarding the pool or set of nodes may be stored in (e.g., database 109, 304, 403), which in some embodiments may be refreshed from time to time as the status of the nodes changes.

As discussed above, in some embodiments transmission manager itself provides a DeviceID and encryption key to each participating node. Alternatively, the DeviceID and/or encryption key may be generated by the nodes themselves and then reported to the transmission manager, for storage (e.g., database 109, 304, 403). In further embodiments, as separate resource (e.g., network credential vault, such as the CyberArk™ Vault) may be responsible for provisioning the encryption keys and/or DeviceIDs for the participating network nodes.

In an operation 502, process 500 may include accessing data to transmit. As discussed above, for example, this may include receiving user input (e.g., through a user interface generated by the transmission manager) identifying a file, data, application code, or various other types of data to be transmitted. In some embodiments, accessing data to transmit may be an automatic operation, where certain types of data or certain trigger conditions satisfied by the data cause the transmission manager to proceed according to process 500. Further, in some embodiments, accessing data to be transmitted may include receiving an identification of a particular receiving node to which the data should be transmitted. For example, this may include receiving user input identifying a receiving node, or accessing a look-up table which specifies certain receiving nodes (e.g., by DeviceID, IP address, MAC address, etc.) which is configured to receive particular types of data or data satisfying certain trigger conditions.

In an operation 503, the transmission manager may be configured to generate a hash based on the data to be transmitted. The hash function may be implemented according to several different hashing techniques, as discussed above.

In an operation 504, the transmission manager may partition or otherwise split the data into two or more data portions. In some embodiments, as discussed above, this may occur according to a preset splitting technique, such as dividing the data into two portions, P1:P2, or into three or more portions. Alternatively, as discussed above, the number of portions for the splitting may be based on security considerations, such as the sensitivity of the data being transmitted (e.g., health records may be considered more sensitive than weather data) or whether the data is to traverse only intra-enterprise nodes or may additionally traverse inter-enterprise nodes. Further, in some embodiments the splitting or partitioning may occur according to particular algorithms such as Shamir's secret-sharing scheme, Blakley's scheme, random splitting, or various other types of schemes.

In operation 505, a unique Session ID may be generated for the transmission of the data to be performed. As discussed above, the Session ID may be random on unique. Further, in some embodiments the Session ID may be a GUID, UUID, or other unique value. In some embodiments, a different Session ID is generated for each transmission of data.

In operation 506, a particular data transmission path may be determined for the data to be transmitted en route to the receiving network node. As discussed above, the data transmission path may be purely random in some embodiments. In other embodiments, the data transmission path may be based on factors such as the currently availability of data nodes, the health or security status of data nodes, the geographic location of data nodes, the proximity of data nodes to the transmission manager and/or receiving node, etc. While in some embodiments each data portion may have a different path, it is also possible that data portions may share the same path.

In operation 507, one or more (i.e., some or all) of the data portions may be encrypted according to the data transmission paths that have been determined. As discussed above, the data segment may be encrypted along with other data (e.g., the Session ID and computed data hash). In some embodiments, only the data segment is encrypted, while in other embodiments all of the data segment, Session ID, and data hash are encrypted. Consistent with the above discussion, the encryption of each data portion may be done in layers using encryption keys corresponding to the different decryption keys held by nodes along the transmission path. For example, the data portion itself (and Session ID and data hash) may be encrypted using a cryptographic key corresponding to the decryption key of the receiving node. The enables the receiving node to finally reveal the data portion, Session ID, and data hash. The next layer of encryption may correspond to the next-to-last node in the pathway, the next layer of encryption may correspond to the second-to-last node in the pathway, and so on. In this manner, as each node in the pathway decrypts the encrypted block it receives, it is able to contribute toward finally revealing the data portion, Session ID, and data hash. The one or more layers of encryption of each data portion may follow the techniques discussed above in connection with FIG. 4.

In operation 508, once the encrypted data portion has been generated (including, in some embodiments, multiple layers of encryption), it may be transmitted according to the data paths for each data portion. The transmission of the data portions may occur as discussed above in connection with FIGS. 1-4. As each node in the transmission pathway receives and decrypts a transmitted block, the block may continue onward to the receiving node, as discussed in connection with FIG. 4.

Figure 6:
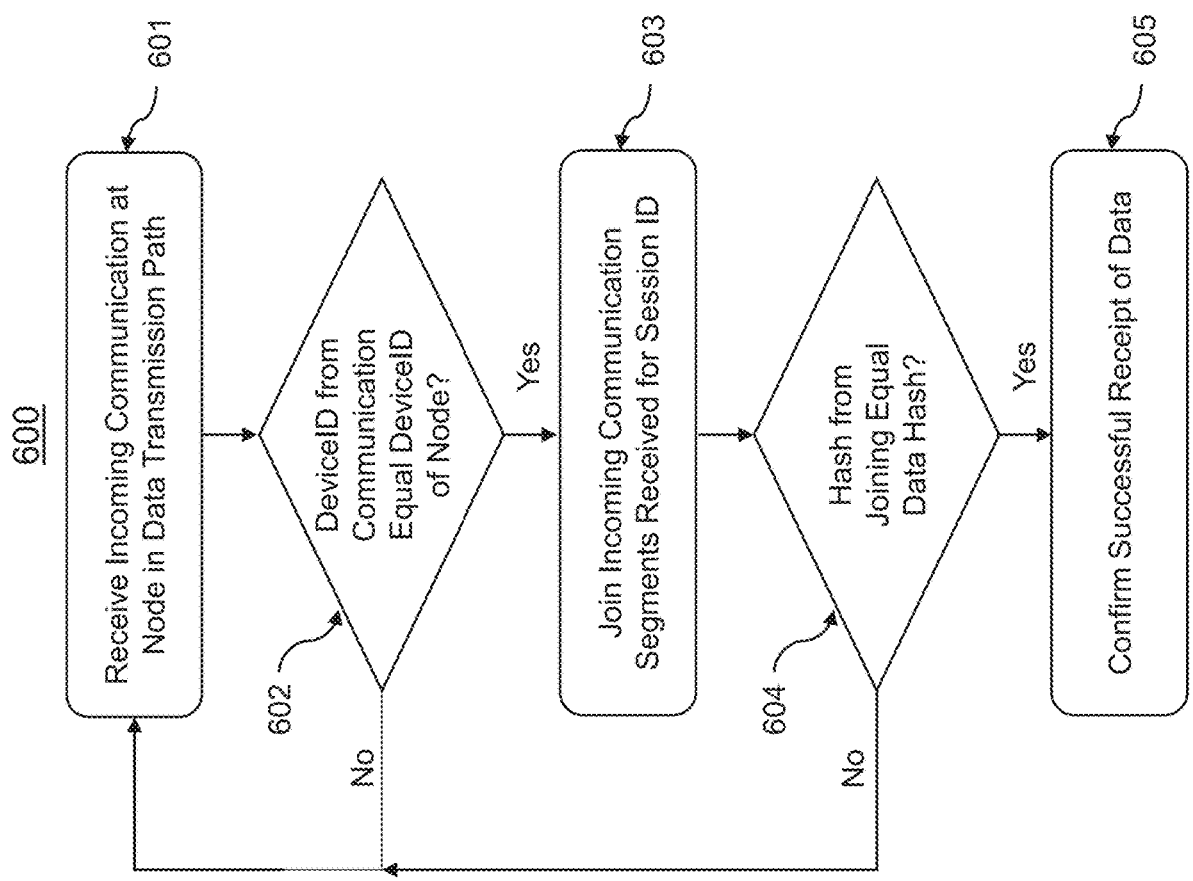
FIG. 6 is a flowchart depicting an exemplary process for receiving encrypted data portions and determining whether all portions of data have been received, in accordance with disclosed embodiments.

FIG. 6 is a flowchart depicting an exemplary process 600 for receiving encrypted data portions and determining whether all portions of data have been received. Consistent with the above discussion, process 600 maybe practiced in the system environments of FIGS. 1-4. For example, process 600 may be practiced by receiving nodes along a transmission pathway (e.g., nodes 103-108, nodes 201-206, nodes 303 and 308-312). While in some embodiments only the receiving node itself (e.g., node 204, node 303) is configured to perform operation 600, in other embodiments each of the nodes in the pathway is configured to perform process 600 for the data portions they receive. Notably, by enabling each node in the pathway to perform process 600, added security may be provided in the sense that individual nodes may not know whether they are the final receiving node in the pathway until they complete the process.

Process 600 may include an operation 601 of receiving an incoming communication at a node in a data transmission path. As discussed above, the node may be an intervening node in the path or may be an endpoint, receiving node for which the data portions are destined. For example, as discussed in connection with FIG. 4, X5-X1 and Y2-Y1 may be communications (e.g., blocks) that are received along communications pathways X and Y. As discussed above, the received communications may be encrypted, based the encryption scheme (e.g., potentially a layered encryption scheme) implemented for the data portions by the transmission manager.

In operation 602, the node receiving the communication may determine whether the DeviceID in the communication equals its own DeviceID. This determination may occur, for example, after the node decrypts the communication using its decryption key. As discussed above in connection with FIG. 4, if the DeviceID does not equal the DeviceID of the receiving node, the receiving node may pass along the decrypted communication according to a DeviceID (or IP address or other address) from the decrypted communication, along the transmission pathway. In FIG. 6, for example, this may signify a "No" at operation 602, and process 600 may look again in operation 601 for additional incoming communications. On the other hand, if in operation 602 the DeviceID of the communication does match the DeviceID of the node (i.e., a "Yes" to the operation), process 600 may continue to operation 603, which checks whether the Session ID of the incoming communication equals the Session ID of any other communications already received by the node. If there is a match in Session ID among two or more received data portions, the node may attempt to join the data portions, as discussed above. For example, the data portions may be joined in different forms repeatedly until a resulting hash of the joined data portion equals a hash provided in the decrypted incoming communication in operation 604. If the hash is not equal (a "No" condition), process 600 may cycle back to operations 601 or 602. Alternatively, if the computed hash is identical to the hash from the decrypted incoming communication, 604 may result in a "Yes" condition and proceed to operation 605, where the node confirms that it is the recipient node, that it has received all data portions of the data being transmitted, and the content of the transmitted data.

Although FIG. 6 shows operation 602 coming before operation 604, in other embodiments their order of operation may be switched. For example, the node may first check and attempt to match the Session ID of received communications before, or without, attempting to match its DeviceID to the DeviceID in the decrypted incoming communication.

Figure 7:
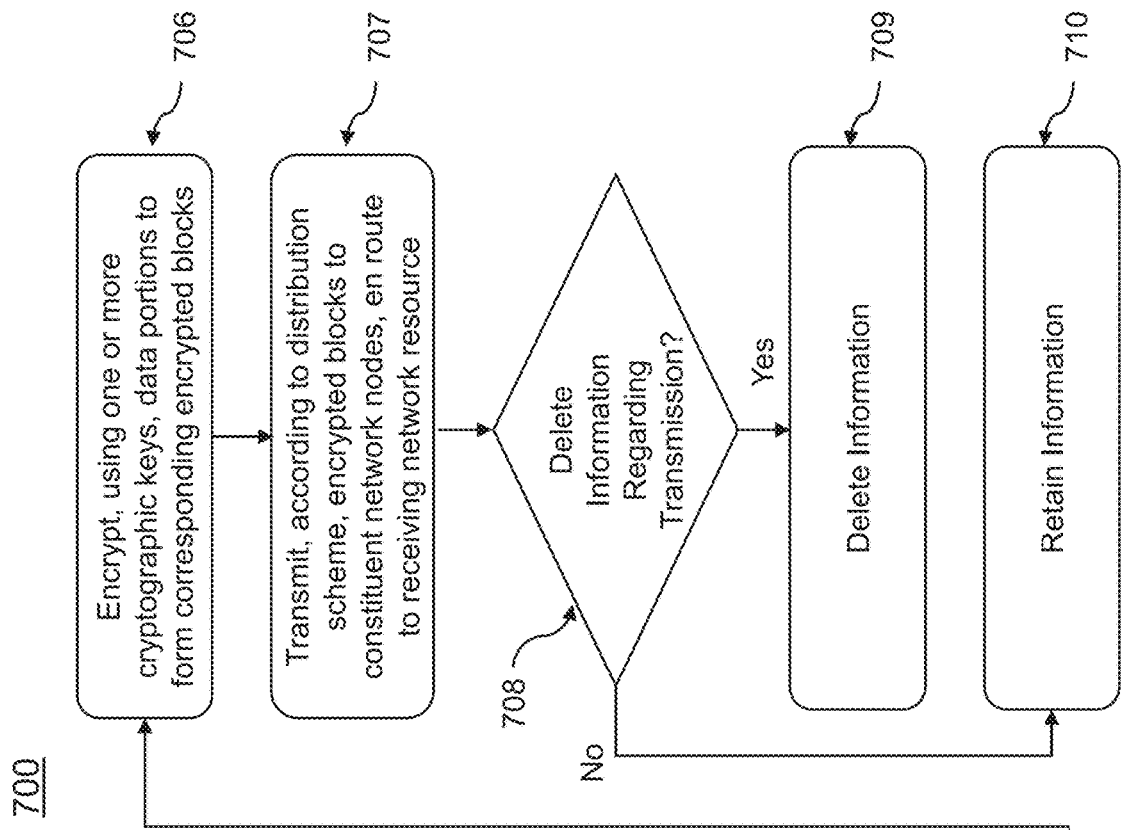
FIG. 7 is a further flowchart depicting an exemplary process for distributed transmission of divisible and reconstructible data among network resources, in accordance with disclosed embodiments.
Figure 7:
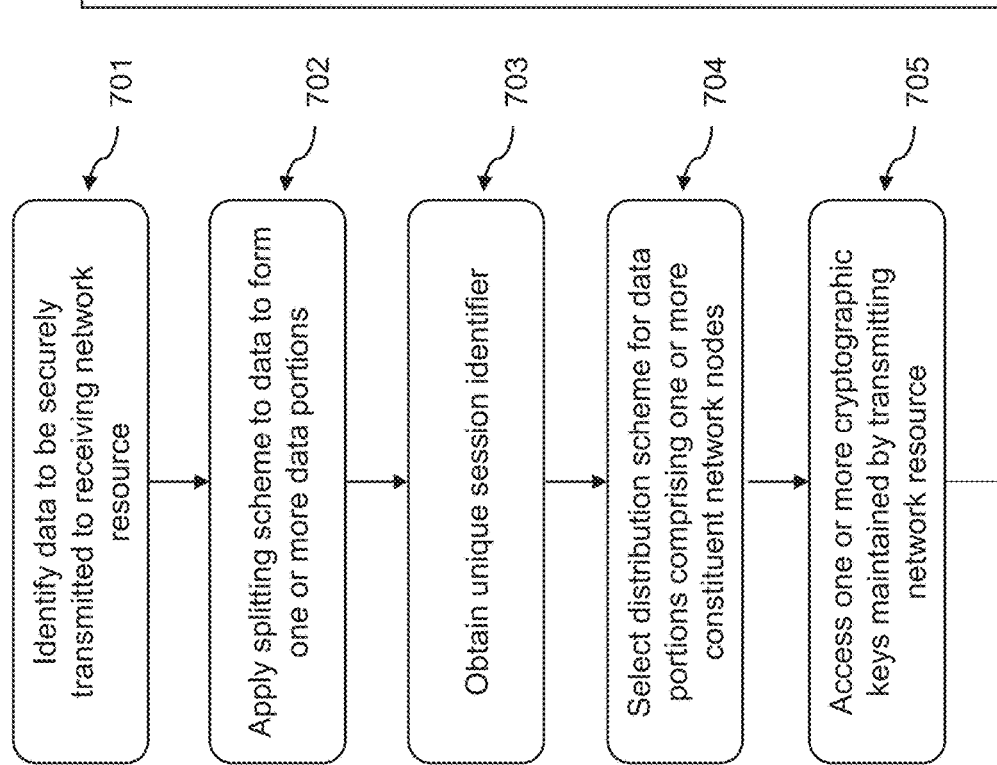

FIG. 7 is a further flowchart depicting an exemplary process 700 for distributed transmission of divisible and reconstructible data among network resources. Consistent with the above discussion, process 700 may be implemented in the system environments of FIGS. 1-5. In many respects, process 700 may be similar to, and may be implemented together with, process 500. For example, process 700 may also be implemented via a transmission manager. As discussed above, the transmission manager may be integrated into a network node or may be a device separate from the network nodes participating in data transmission.

In an operation 701, process 700 may include identifying, at a transmitting network resource, data to be securely transmitted across a network to a receiving network resource. Consistent with above embodiments, this may involve identifying user input at the transmission manager of a particular data file, portion of data, file, application code, or other information to be transmitted. Alternatively, this may involve automatically identifying data of a particular type, of that satisfies a particular trigger condition, to be transmitted. In some embodiments, as discussed above, identifying the data to be transmitted may further involve identifying an identity (e.g., network identifier, IP address, MAC address, etc.) of a receiving network resource. For example, the receiving network resource may be specified in a look-table or policy associated with the particular type of data to be transmitted, a particular transmitting identity, a particular triggering condition that has been satisfied, etc.

In operation 702, process 700 includes applying a splitting scheme to the data to form one or more data portions. For example, as discussed above in connection with FIGS. 2-4, a particular data element (e.g., document, raw data, file, application code, software update, etc.) may be split into two or more portions. The splitting scheme may involve partitioning or slicing the data into a preset number of segments (e.g., two or more) or may be based on the condition or status attributes of the transmission manager, recipient, or intermediary nodes. For example, if the data is deemed particularly sensitive (e.g., personal health data, personal financial data, sensitive corporate data, etc.) a larger number of data portions may be utilized, whereas for less sensitive data (e.g., IoT sensor data, observational environment data, etc.) a fewer number of portions may be needed. Further, as discussed above, the partitioning may be based on algorithms such as Shamir's secret-sharing scheme, Blakley's scheme, random splitting, or various other types of schemes. As discussed above, in some embodiments one or more of the data elements may be a fictive (e.g., nonce or null) data portion rather than a real or action data portion.

In operation 703, process 700 may include obtaining a unique session identifier. As discussed above, this may involve the transmission manager generating a unique session identifier. In some embodiments the unique session identifier may be a randomly generated number. Alternatively, it may be a unique value, such as a GUID or UUID. The transmission manager may be configured to generate a unique session identifier for each transmission session it performs. For example, each data element it transmits may have its own unique session identifier. As discussed further below, the transmission manager may be configured to persistently store the unique session identifier, or may be configured to forget (e.g., delete) the unique session identifier (e.g., once the transmission is complete, once confirmation of the transmission being complete is received, after a time period elapses, etc.).

In operation 704, process 700 includes selecting a distribution scheme for the one or more data portions. Consistent with the above disclosure, the distribution scheme may include one or more constituent network nodes through which the data portions may be passed. In a situation where there is only one intermediary node between the transmission manager and the recipient, there may be only one constituent node. Of course, in other embodiments there may be many constituent or intermediary nodes. Notably, in a zero-trust environment, the one or more constituent network nodes between the transmission manager and the recipient may each lack access to the selected distribution scheme. In other words, the constituent nodes may not receive information identifying how many pieces the data has been split into, what type of encryption has been used, the identity of the transmission manager, the identity of the recipient, or the sequence of the distribution path from the transmission manager to the recipient. Consistent with the discussion above regarding FIGS. 2-4, each of the constituent nodes may have an associated network address (e.g., IP address, MAC address, etc.) and a cryptographic key (e.g., symmetric or asymmetric). The cryptographic keys may be stored locally in each of the intermediary nodes or may be accessible (e.g., via a vault) to such nodes.

In operation 705, process 700 includes accessing one or more cryptographic keys maintained by the transmitting network resource. For example, as discussed above, the transmission manager may maintain cryptographic keys, or data identifying such keys, in a database. The keys maintained by the transmission manager may correspond to the keys held by the constituent nodes. For example, if the constituent nodes each have an asymmetric (e.g., public) decryption key, the transmission manager may maintain corresponding asymmetric (e.g., private) encryption keys from public-private key pairs. Similarly, if the constituent nodes each have symmetric keys, the transmission manager may have corresponding (e.g., the same) symmetric keys. As discussed above, the cryptographic keys maintained by the transmission manager may be stored locally by the transmission manager or stored remotely but accessible to the transmission manager (e.g., via a vault).

In operation 706, process 700 may include encrypting, using the one or more cryptographic keys maintained by the transmitting network resource, the one or more data portions to form a plurality of corresponding encrypted blocks. For example, as discussed in connection with FIGS. 3-4, the data portion may be encrypted, along with the Session ID and hash of the data, in one or more layers of encryption corresponding to the nodes in the transmission path. If there is only one constituent node, there may be two layers of encryption: one for the constituent node to decrypt, and the other for the recipient node itself to decrypt. Similarly, additional layers of encryption may be applied to the data portion, Session ID, and data hash if there are additional nodes in the transmission path. As discussed above, the one or more data portions may have the same, or different, pathways en route to the recipient node. Accordingly, the one or more data portions may have the same, or different, layered encryption scheme applied to them. In some embodiments, the encryption is performed on each of the data portions, the Session ID, and the data hash, while in other embodiments only the data portions are encrypted.

Consistent with the discussion above, the one or more constituent network nodes may be configured to decrypt at least a portion of one or more of the plurality of encrypted blocks (e.g., decrypt just one layer, or multiple layers), and route the decrypted portion(s) of the one or more of the plurality of encrypted blocks to either another of the one or more constituent network nodes or to the receiving network resource. For example, as discussed above in connection with FIG. 5, a constituent node may determine whether the decrypted block contains a network resource identifier that matches its own network resource identifier. If so, it may attempt to join the data portions it has received according to a given Session ID. Alternatively, if the decrypted block contains a different network resource identifier (e.g., that of a next constituent node to which to send the decrypted block), the node may send the decrypted block to the next node in the pathway.

In operation 707, process 700 includes transmitting, according to the selected distribution scheme, the one or more of the plurality of encrypted blocks to one or more of the constituent network nodes, en route to the receiving network resource. For example, as discussed above in connection with FIGS. 2-4, the two or more data portions may sent to the first of one or more constituent network nodes in their respective distribution paths. While both of the distribution paths may be the same or different (e.g., different in terms of numbers of nodes, identities of nodes, etc.), both may eventually lead to the data portions reaching the recipient node. As discussed above, some or all nodes alone the distribution path may be configured to decrypt one or more layers of encryption on the data portions. In such embodiments, with each successive decryption of a layer, the encrypted data block progresses toward the recipient so that the recipient node can decrypt the block it receives, and thereby obtain the data portion, Session ID, and data hash. As discussed in connection with FIG. 5, the receiving network resource may be configured to, upon obtaining the one or more data portions, and with reference to the unique session identifier, combine and validate the one or more data portions. For example, the recipient node may try one or more different ways to join the different data portions it has received for a particular Session ID, and for each joinder it may attempt to calculate a hash of the joined data and compare it to the received hash for the data. If there is no match, the recipient node may determine that it has not received all data portions. If there is a match, the recipient can confirm that it is the recipient, that it has received all portions, and may further confirm the data being transmitted.

In some embodiments, process 700 may also include an operation 708 of determining whether to delete or discard information regarding a particular data transmission. For example, the transmission manager may be configured to automatically delete transmission data (e.g., the Session ID, the distribution path, the transmitted data itself, information regarding the constituent nodes along the path, etc.) if the transmission has been performed, if a confirmation is received (e.g., from the recipient) that the transmission has been performed, or based on other circumstances. Further, the transmission manager may be configured to automatically delete transmission information periodically or after defined time periods elapse. When the transmission manager decides in operation 708 to delete transmission data, it may decide ("Yes") to delete the information in operation 709. Alternatively, in some embodiments the transmission manager may not decide to delete the transmission data, or may affirmatively device to keep (e.g., log or archive) the transmission data. In that circumstance ("No"), process 700 leads to operation 710 of retaining the transmission data.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for distributed transmission of divisible and reconstructible data among network resources, the operations comprising:
    identifying, at a transmitting network resource, data to be securely transmitted across a network to a receiving network resource;
    computing a first hash value based on the data;
    applying a splitting scheme to the data to form a plurality of data portions;
    obtaining a unique session identifier;
    selecting a distribution scheme for the plurality of data portions, the distribution scheme comprising different distribution paths for different of the plurality of data portions among one or more constituent network nodes, the one or more constituent network nodes each lacking access to the selected distribution scheme and each having:
        an associated network address, and
        a cryptographic key;
    accessing one or more cryptographic keys maintained by the transmitting network resource;
    encrypting, using the one or more cryptographic keys maintained by the transmitting network resource, the plurality of data portions to form a plurality of corresponding encrypted blocks, wherein at least one of the plurality of encrypted blocks includes the first hash value, and wherein the one or more constituent network nodes are configured to:
        decrypt at least a portion of one or more of the plurality of encrypted blocks, and
        route the decrypted portion of the one or more of the plurality of encrypted blocks to either another of the one or more constituent network nodes or to the receiving network resource; and
    transmitting, according to the selected distribution scheme, the one or more of the plurality of encrypted blocks to one or more of the constituent network nodes, en route to the receiving network resource;
    wherein the receiving network resource is configured to, upon obtaining the plurality of data portions, and with reference to the unique session identifier, combine and validate the plurality of data portions, the validation being based on a comparison of the first hash value to a second hash value computed based on the combined plurality of data portions.

2. The non-transitory computer readable medium of claim 1, wherein the transmitting network resource and the receiving network resource operate on a zero-trust basis with respect to each other.

3. The non-transitory computer readable medium of claim 1, wherein the transmitting network resource and the receiving network resource are in separate networks.

4. The non-transitory computer readable medium of claim 1, wherein the selecting of the distribution scheme includes randomly selecting the one or more constituent network nodes.

5. The non-transitory computer readable medium of claim 4, wherein the randomly selecting includes randomly selecting a number of constituent network nodes for each of the plurality of data portions to traverse en route to the receiving network resource.

6. The non-transitory computer readable medium of claim 1, wherein the receiving network resource cannot determine, before the combining and validating of the plurality of data portions, whether it has received all of the plurality of data portions.

7. The non-transitory computer readable medium of claim 1, wherein the operations further comprise deleting, after the transmitting of the plurality of encrypted blocks, the distribution scheme.

8. The non-transitory computer readable medium of claim 1, wherein the receiving network resource is further configured to, upon receiving the plurality of data portions, and with reference to the unique session identifier:
    combine the plurality of data portions according to a first combination;
    attempt to validate the plurality of data portions according to the first combination, wherein the attempted validation according to the first combination fails;
    combine the plurality of data portions according to a second combination; and
    attempt to validate the plurality of data portions according to the second combination, wherein the attempted validation according to the second combination succeeds.

9. The non-transitory computer readable medium of claim 1, wherein the splitting scheme is applied to form at least one portion of the data and at least one fictive portion that does not contain any of the data, and wherein both the at least one portion and the at least one fictive portion are transmitted according to the selected distribution scheme.

10. A computer-implemented method for distributed transmission of divisible and reconstructible data among network resources, the method comprising:
   identifying, at a transmitting network resource, data to be securely transmitted across a network to a receiving network resource;
   computing a first hash value based on the data;
   splitting the data into a a plurality of data portions;
   obtaining a unique session identifier;
   selecting a distribution scheme for the plurality of data portions, the distribution scheme comprising different distribution paths for different of the plurality of data portions among one or more constituent network nodes, the one or more constituent network nodes each lacking access to the selected distribution scheme and each having:
      an associated network address, and
      a cryptographic key;
   accessing one or more cryptographic keys maintained by the transmitting network resource;
   encrypting, using the one or more cryptographic keys maintained by the transmitting network resource, the plurality of data portions to form a plurality of corresponding encrypted blocks, wherein at least one of the plurality of encrypted blocks includes the first hash value, and wherein the one or more constituent network nodes are configured to:
      decrypt at least a portion of one or more of the plurality of encrypted blocks, and
      route the decrypted portion of the one or more of the plurality of encrypted blocks to either another of the one or more constituent network nodes or to the receiving network resource; and
   transmitting, according to the selected distribution scheme, the one or more of the plurality of encrypted blocks to one or more of the constituent network nodes, en route to the receiving network resource;
   wherein the receiving network resource is configured to, upon obtaining the plurality of data portions, and with reference to the unique session identifier, combine and validate the plurality of data portions, the validation being based on a comparison of the first hash value to a second hash value computed based on the combined plurality of data portions.

11. The computer-implemented method of claim 10, wherein obtaining the unique session identifier includes generating the unique session identifier.

12. The computer-implemented method of claim 10, wherein the unique session identifier is included in at least one of the plurality of encrypted blocks.

13. The computer-implemented method of claim 10, wherein the receiving network resource is further configured to, upon receiving each of the plurality of encrypted blocks, attempt to combine and validate the plurality of data portions.

14. The computer-implemented method of claim 10, wherein the data to be securely transmitted comprises at least one of: a secret, a credential, sensitive data, software code, or a software update.

15. The computer-implemented method of claim 10, wherein the distribution scheme is based on a network security policy.

16. The computer-implemented method of claim 15, wherein the network security policy considers a security status of a universe of network nodes in order to select the one or more constituent network nodes.

17. The computer-implemented method of claim 15, wherein the network security policy considers an activity status of a universe of network nodes in order to select the one or more constituent network nodes.

18. The computer-implemented method of claim 10, wherein the selected distribution scheme comprises a plurality of distinct transport paths, each of the plurality of distinct transport paths including a plurality of the one or more constituent network nodes.

19. The computer-implemented method of claim 18, wherein each of the plurality of distinct transport paths is assigned to one of the plurality of data portions in the selected distribution scheme.

* * * * *